Patented Dec. 13, 1932

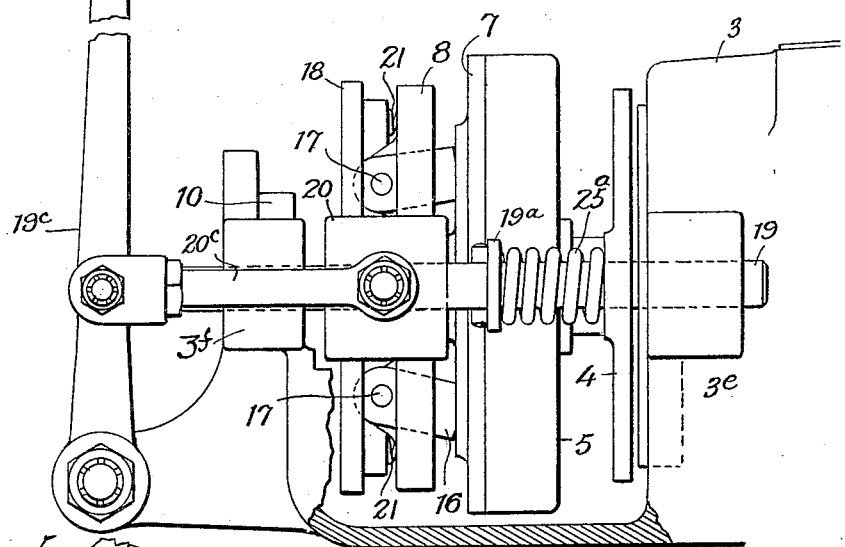
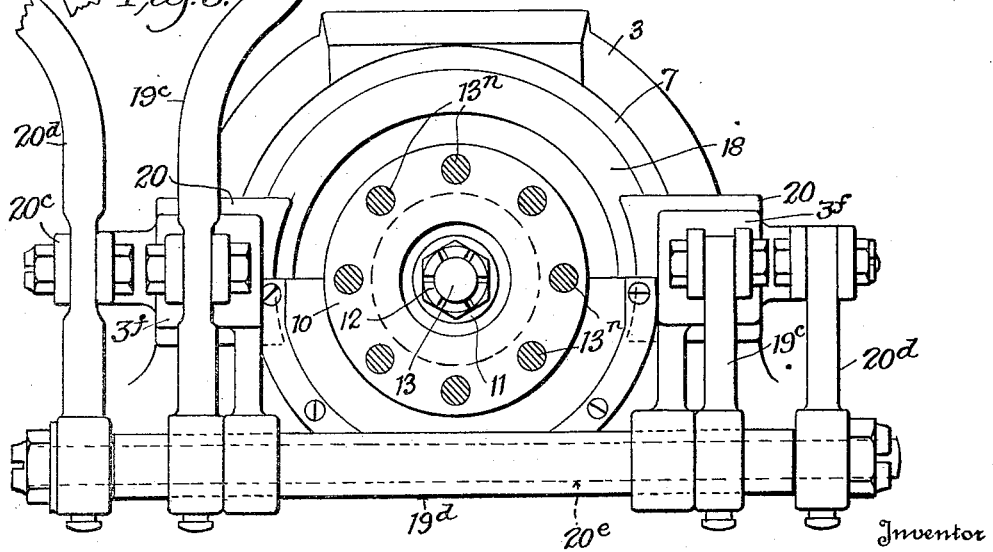

1,891,182

UNITED STATES PATENT OFFICE

DAVID E. ROSS, OF LA FAYETTE, INDIANA, ASSIGNOR TO THE FAIRFIELD MANUFACTURING COMPANY, OF LA FAYETTE, INDIANA, A CORPORATION OF INDIANA

CLUTCH MECHANISM FOR PLANETARY GEARING

Application filed November 9, 1931. Serial No. 573,971.

The object of this invention is to provide a novel arrangement of planetary gearing and disk clutches between a prime mover or driving shaft and a driven shaft such as the propeller shaft of a motor boat, so that without stopping the motor or driving shaft by merely shifting the clutches the propeller or driven shaft may be made to turn in a forward direction or reverse direction, or stopped.

The novel mechanism includes a driving shaft, a driven shaft and planetary gears interposed between the driving and driven shafts mounted in a rotatable casing, two sets of clutches keyed to the hub of the planetary gear housing concentric with the driven member, an adjustable member engaging one clutch to lock the planetary gear housing to a stationary part of the framing in which the mechanism is mounted, a slidable member keyed to the driven shaft and spring means for engaging this member with the other clutch to lock the planetary housing to the driven shaft, and novel mechanism whereby the driven member may be clutched to the planetary gear housing, or declutched therefrom.

I will describe one practical embodiment of the invention as illustrated in the accompanying drawings to enable others to adopt and use the same; and refer to the claims for concise definitions of novel features of the invention and novel combinations of parts for which protection is desired.

In said drawings:

Fig. 4 is a reduced side view of the mechanism shown in Fig. 1 and

Fig. 5 is an end view of Fig. 4.

Figure 1:
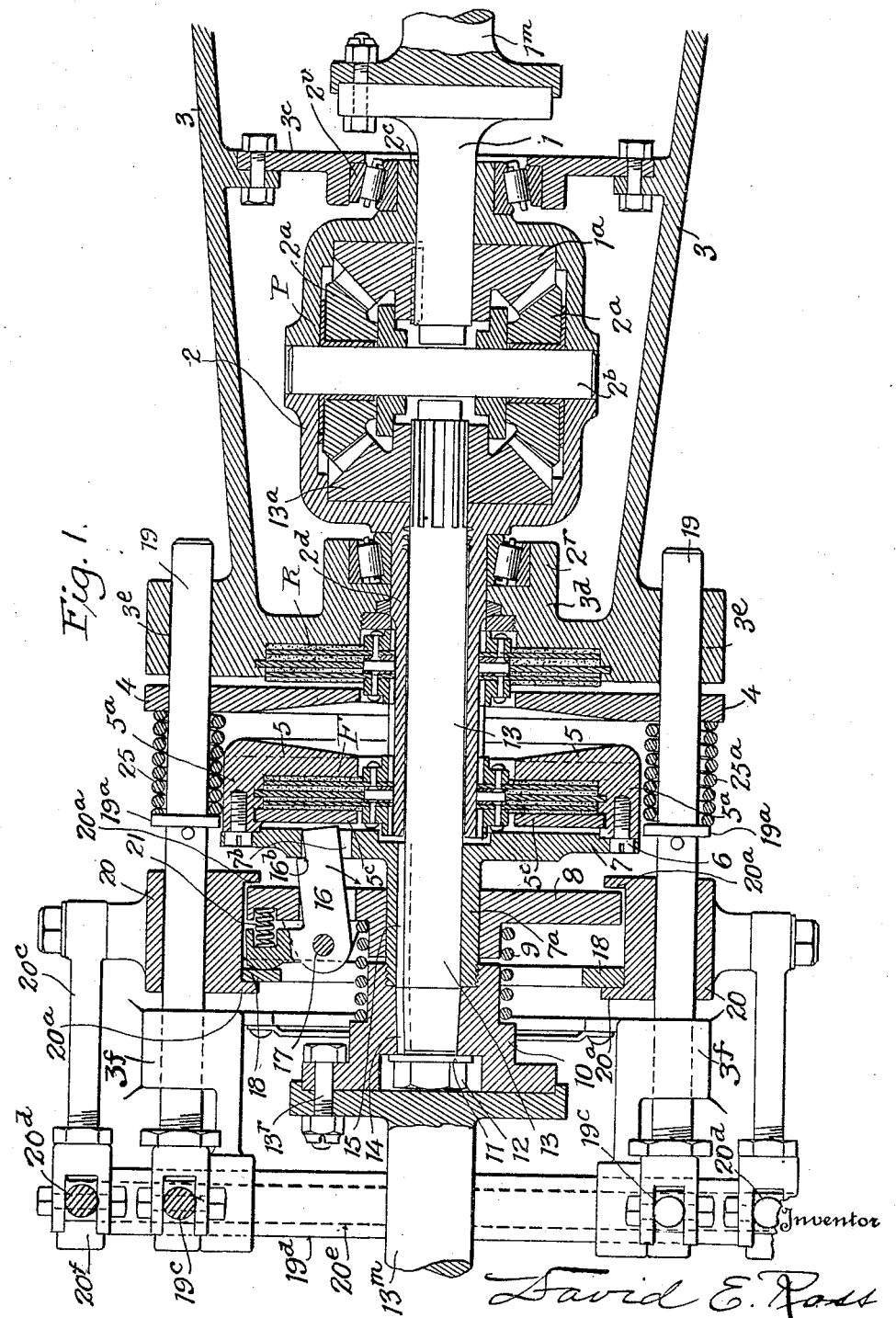
Fig. 1 is a longitudinal horizontal section through a complete mechanism embodying the invention as applied between the driving and driven shafts.

Referring to the drawings, 1 represents the "driving" shaft which may be connected direct to the shaft 1m of an engine or motor of any suitable type and be driven thereby. This driving shaft projects into a planetary gear housing 2 and has on its end within the housing a bevel gear 1a. Within the gear housing opposite the gear 1a is a gear 13a splined on the end of the driven shaft 13 which projects into the planetary gear housing.

The planetary gears 2a are rotatably mounted upon a transverse shaft 2b in the housing 2 and mesh with both gears 1a and 13a in the usual manner. The gear housing 2 has a hub portion 2c through which shaft 1 extends, and an extended hub portion 2d through which shaft 13 extends. The hub portion 2d, 2c are preferably supported in roller bearings 2r in transverse members 3c and 3d of the frame 3, which may be of any suitable construction so as to support the parts.

Splined upon the hub 2d is a friction clutch R which is preferably a multiple disk clutch of any suitable construction. (The particular construction of the clutches is not a feature of this invention.) One side of this clutch is adapted to engage the adjacent wall of the part 3d of the casing; and at the opposite side of the clutch is a clutch-engaging member 4 adapted to engage the clutch R and cause it to bind against the wall 3d. This member 4 is preferably hung upon rods 19 which are slidably mounted in openings 3e, 3f of the casing 3. Springs 25 are strung on rod 19 between the member 4 and collars 19a on the rods, so that by moving the rods the member 4 can be caused to yieldingly engage and clamp the clutch R against the wall 3d and thus lock the planetary gear housing to the casing, and when thus locked the driven shaft 13 would be rotated in a direction reverse to that of the driving shaft. The rods 19 may be operated by any suitable means.

As shown, the rear ends of these rods 19 are connected to levers 19c on a rock shaft 19d and by rocking the shaft the clutch R can be engaged or disengaged to lock the planetary gear to the housing.

The forward drive clutch F is fixed on hub 2d between a disk 7 and an annular member 5 having a peripheral flange 5a secured to disk 7 by bolts 6. The disk 7 has a hub 7a splined at 14 on the driven shaft 13. Within the flange 5a of member 5 is slidably mounted a ring 5c which is movable axially of the driven shaft, and when it is desired to have clutch F lock the driven shaft to the planetary gear housing, this ring 5c is forced toward the plate 5 so as to compress the clutch F therebetween as shown in Fig. 2, but plate 5c is permitted to release clutch F when clutch R is to be engaged, or to reverse the motion of the driven shaft, or when the driven shaft is to remain idle.

The engagement or disengagement of the clutch F is controlled by one or more dogs 16, pivoted as at 17 between lugs on a member 8 which is slidably mounted on the hub 7a of the disk 7. The free ends of the dogs 16 project through openings 7b in disk 7 and are adapted to engage the ring 5c. The dogs are normally swung outwardly by means of springs 21 interposed between the disk 8 and arms 16a of the dogs, so that the shoulders 16b of the dogs engage the outer edges of the openings in disk 7 and prevent inward movement of the dogs (see Figs. 1 and 3); and in such position of the dogs the clutch F runs loosely between the ring 5c and the annular member 5.

Figure 2:
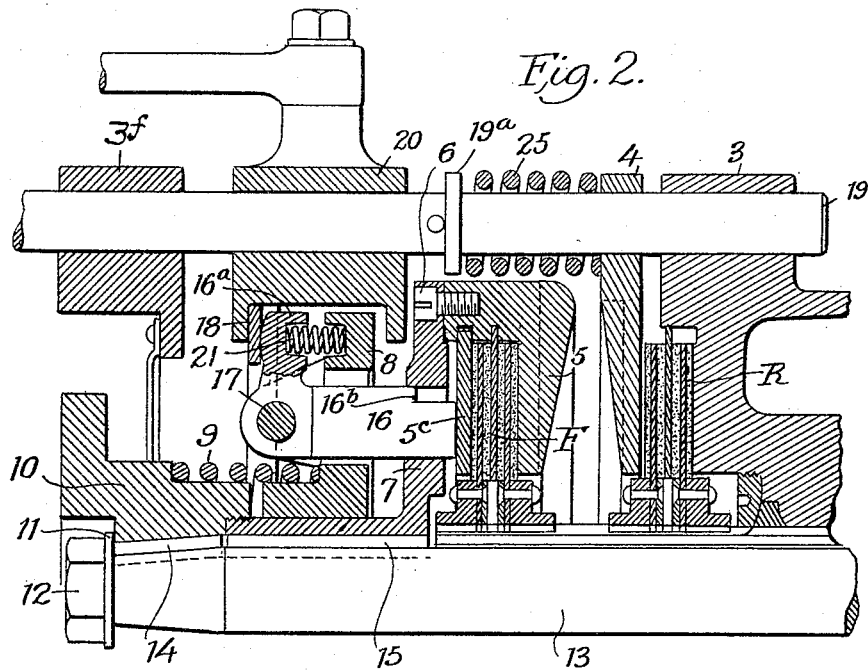
Fig. 2 is a detail sectional view showing the parts adjusted to forward position.
Figure 3:
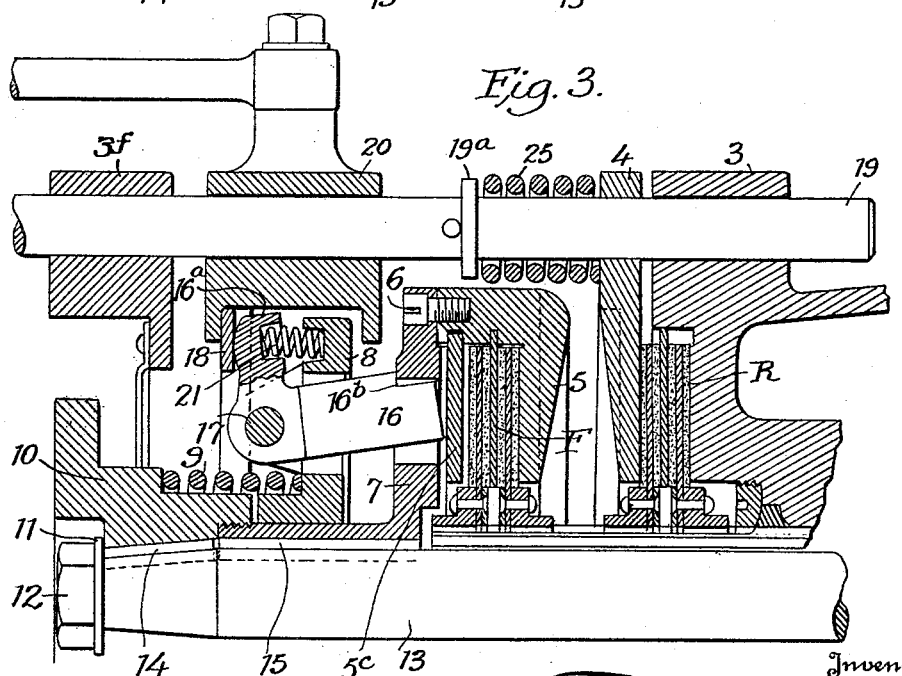
Fig. 3 is a similar detail sectional view showing the parts adjusted to reverse position.

The member 8 is yieldingly pressed toward disk 7 by an expansion spring 9 strung on the hub of member 8 and the hub of a coupling member 10 non-rotatably fastened to the adjacent end of driven shaft 13, by a nut 12 and washer 11 (see Figs. 1 to 3). To this head 10 may be secured the flanged head of a propeller or other shaft 13m by means of bolts 13r so that the propeller shaft is rotated by and with the driven shaft 13. The member 8 is disposed between slidable blocks 20 having internal flanges 20a which loosely embrace the member 8 so that the latter can have a limited amount of play axially of the member 10 between said flanges. The blocks 20 may be slidably supported on the rods 19, and may be bodily moved toward or from the disk 7, and may be adjusted in position on the rods, by means of links 20c connected with levers 20d pivoted on rock shaft 20e, which may extend through the tubular shaft 19d.

A ring 18 is interposed between the outer flange 20a on blocks and the arms 16a of the dogs 16 (indicated in Figs. 1, 2 and 3), and when the blocks 20 are drawn outwardly, as in Fig. 1, the member 8 is engaged by the flanges 20a and drawn outward and moves dogs 16 away from plate 7 until the springs 21 cause the notches 16b in the dogs to engage with the outer edges of the openings in disk 7, as indicated in Figs. 1 and 3, thereby releasing the clutch F.

When the parts are in the position shown in Fig. 1 neither clutch R or F is operatively engaged, and therefore the planetary gears can run idly and not transmit motion from the driven to the driving shaft. If it is desired to drive the shaft in a forward direction the blocks 20 are moved inwardly to the position indicated in Fig. 2, thereby causing ring 18 to engage arms 16a of the dogs and compress springs 21 which will cause the notches of the dogs to disengage the edges of the openings in disk 7, whereupon the spring 9 throws the disk 8 and the dogs inward (see Fig. 2), the dogs engaging ring 5c and causing it to clamp the clutch F between the ring 5c and annulus 5. The clutch F then locks the planetary gear housing 2 to the driven shaft 13, and therefore driven shaft 13 is rotated by and with the driving shaft 1, the clutch R being then disengaged (see Fig. 2). The inward movement of the dogs 16 and engagement of the clutch F may be controlled by levers 20f which may be manually operated by hand or by foot, the particular mechanism for manually operated these levers not being shown in the drawings and forming no part of the present invention.

When the member 8 is withdrawn to release clutch F (as shown in Figs. 1 and 3), spring 9 is compressed and dogs 16 are engaged with disk 7, as indicated in Fig. 3, thereby freeing the clutch F between the members 5 and 5c. Thus end thrust on rotating parts is prevented except at such times as the mechanism is being shifted. Since there is clearance between the blocks 20 and the members 8 and 18 there will be no friction therebetween while the mechanism is running. It will be seen that when the driven member 13 is interlocked by clutch F with the hub of the planetary gear housing, the whole mechanism will turn over as a unit in the "forward" direction.

To shift the members into reverse the blocks 20 are moved to permit the dogs 16 to release the portion indicated in Figs. 1 and 3; then rods 19 are shifted so as to move the annulus 4 inward until it engages clutch R and clamps the discs against the wall of the housing, thus locking the planetary gear housing to the frame as in Fig. 3, whereupon, due to the nature of the planetary gearing, the driven shaft will be rotated reversely to the driving shaft.

The hub 2d of the planetary gear housing carries the multiple disk clutch R to be used to lock the hub to the frame and stop rotation of the housing and also a similar multiple disk clutch F used to lock the hub of the planetary gear housing to the member 7, which will then rotate the driven shaft in the forward direction. Thus by properly adjusting the annulus 4 and/or blocks 20, without stopping the motor, the direction of rotation of the driven shaft can be changed from forward to backward or vice versa. When the clutch F is disengaged as in Fig. 3, and the annulus 4 moved back to the position indicated in Fig. 2, so as to release the clutch R also, then the planetary gear housing can revolve with the driving shaft without imparting motion to the driven shaft in either direction.

On the "forward" drive the planetary gears are interlocked so there will be no noise; and the propeller shaft has the same speed in reverse as in forward. In the commonly used planetary gears, the gears are noisy in reverse and the propeller runs at a reduced speed.

When the housing of the planetaries is stopped from rotation by interlocking with the frame, then the propeller will run in reverse. When the planetary gears are interlocked the whole mechanism turns over as a unit, and gives the direct or "forward" drive. The mechanism would operate just as well in the forward drive if the planetary gears were locked to the engine shaft; but on account of ease of operation, I prefer to interlock the planetary housing to the propeller shaft or driven member as described.

The mechanism described makes a very convenient easily controlled driving arrangement for propellers of motor boats. The parts are all easily assembled for inspection and adjustment; and by means of the dogs the forward drive multiple disk clutch can be readily held disengaged, or may be readily engaged by shifting the controlling blocks 20.

I claim:—

1. In mechanism of the character specified, a driving shaft, a driven shaft, gears on the adjacent ends of said shafts, planetary gears between the gears on the driving and driven shafts, a housing for said gears, manually controlled mechanism for locking the housing against rotation to cause reverse rotation of the driven shaft; a clutch fixed to the housing and rotatable therewith, a clutch engaging member fixed on the driven shaft adapted to be engaged with said clutch, spring means for causing said member to engage the clutch, dogs pivoted on said member and adapted to hold the clutch disengaged, means for normally holding the dogs out of operative engagement with the clutch, and means for releasing the dogs to permit the clutch to lock the housing to the driven shaft.

2. In mechanism of the character specified, a driving shaft, a driven shaft, gears on the adjacent ends of said shafts, planetary gears between the gears on the driving and driven shafts, a housing for said gears, manually controlled mechanism for locking the housing against rotation to cause reverse rotation of the driven shaft; a clutch fixed to the housing and rotatable therewith, a disk splined to the driven shaft and a member carried by said disk adapted to engage one side of said clutch, a ring in said member adapted to engage the opposite side of the clutch; a member slidably mounted beside the disk, spring means for moving the slidable member toward the disk; dogs pivoted on said slidable member normally held out of engagement with the clutch, and means for releasing the dogs thereby permitting the slidable member to move the dogs to cause the clutch to lock the housing to the driven shaft.

3. In mechanism of the character specified, a driving shaft, a driven shaft, planetary gearing between the adjacent ends of said shafts, a rotatable housing for said gearing, a friction clutch mounted on the hub of the housing, a disk fixedly mounted on the driven shaft at one side of said clutch, a member carried by said disk at the opposite side of the clutch, a member slidably mounted on the driven shaft beside the disk, spring means for moving said slidable member toward the disk, dogs carried by said slidable member adapted to engage the clutch, said dogs when retracted locking the slidable member in position away from the disk and manually operable means for releasing the dogs whereupon the slidable member causes the dogs to close the clutch and lock the housing to the driven member.

4. In mechanism of the character specified, a driving shaft, a driven shaft, planetary gearing between the adjacent ends of said shafts, a rotatable housing for said gearing, a friction clutch mounted on the hub of the housing, a disk fixedly mounted on the driven shaft at one side of said clutch, an annulus carried by said disk at the opposite side of the clutch, a second disk slidably mounted on the first disk, dogs pivoted on the second disk and adapted to project through the slots in the first disk into engagement with the clutch, springs whereby when the slidable disk is retracted the dogs are engaged with the outer side of the first disk and held out of engagement with the ring, spring means for moving the second disk inward when the dogs are disengaged, and manually operable means whereby the dogs may be disengaged when it is desired to lock the housing to the driven shaft.

5. In mechanism of the character specified, a driving shaft; a driven shaft, planetary gearing between the adjacent ends of said shafts, a rotatable housing for said gearing, manually controlled means for locking the housing against rotation; a friction clutch mounted on the hub of the housing, a disk fixedly mounted on the driven shaft at one side of said clutch, a member carried by said disk at the opposite side of the clutch, a member slidably mounted on the driven shaft beside the disk, spring means for moving said slidable member toward the disk, dogs pivoted on said slidable member and adapted to project through slots in the disk to engage the friction clutch, said dogs locking the slidable member in position away from the disk when the slidable member is retracted, and manually operable means whereby the dogs can be released to permit the slidable member to move the dogs to close the clutch and lock the housing to the driven member.

6. In mechanism of the character specified, a driving shaft, a driven shaft, planetary gearing between the adjacent ends of said shafts, a rotatable housing for said gearing, manually controlled means for locking the housing against rotation; a friction clutch mounted on the hub of the housing, a disk fixedly mounted on the driven shaft at one side of said clutch, an annulus carried by said disk at the opposite side of the clutch, a ring interposed between the disk and the clutch, a second disk slidably mounted on the first disk, dogs pivoted on the second disk and adapted to project through the slots at the first disk into engagement with the ring, springs whereby when the slidable disk is retracted the dogs are engaged with the outer side of the first disk and held out of engagement with the ring, spring means for moving the second disk inward when the dogs are disengaged, and manually operable means whereby the dogs may be disengaged from the first disk when it is desired to lock the housing to the driven shaft.

7. In mechanism as set forth in claim 3, said means comprising a member movable toward or from the clutch, a spring for moving said member toward the second clutch, spring actuated dogs adapted in one position to lock said member against movement toward the second clutch, and manually controlled means for disengaging the dogs and permitting them to operate the clutch.

8. In mechanism of the character specified, a driving shaft, a driven shaft, planetary gearing between the driving and driven shafts, manually controlled clutch mechanism for locking the housing against rotation when reverse movement is desired, a second clutch fixed to the housing and rotatable therewith, a disk splined to the driven shaft carrying an annulus adapted to engage one side of the second clutch, and a ring adapted to engage the opposite side of the second clutch, a member slidably mounted on the driven shaft, spring means for yieldably moving the member toward the second clutch, dogs pivoted on said disk, springs for normally holding the dogs out of engagement with the ring, and means for disengaging the dogs and permitting them to engage the ring and cause it to clamp the clutch against the annulus thereby locking the housing to the driven shaft.

DAVID E. ROSS.